(12) United States Patent
Shi et al.

(10) Patent No.: US 12,006,451 B2
(45) Date of Patent: Jun. 11, 2024

(54) TWO-COMPONENT SOLVENT-LESS ADHESIVE COMPOSITION

(71) Applicants: Dow Global Technologies LLC, Midland, MI (US); Rohm and Haas Company, Collegeville, PA (US)

(72) Inventors: Rui Shi, Shanghai (CN); Zhaohui Qu, Shanghai (CN); Yinzhong Guo, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 513 days.

(21) Appl. No.: 17/414,584

(22) PCT Filed: Dec. 21, 2018

(86) PCT No.: PCT/CN2018/122618
§ 371 (c)(1),
(2) Date: Jun. 16, 2021

(87) PCT Pub. No.: WO2020/124542
PCT Pub. Date: Jun. 25, 2020

(65) Prior Publication Data
US 2022/0056324 A1 Feb. 24, 2022

(51) Int. Cl.
| | | |
|---|---|---|
| *B32B 41/00* | (2006.01) |
| *C08G 18/12* | (2006.01) |
| *C08G 18/40* | (2006.01) |
| *C08G 18/42* | (2006.01) |
| *C08G 18/48* | (2006.01) |
| *C08G 18/76* | (2006.01) |
| *C09J 175/06* | (2006.01) |
| *C09J 175/08* | (2006.01) |

(52) U.S. Cl.
CPC ............ *C09J 175/06* (2013.01); *C08G 18/12* (2013.01); *C08G 18/4018* (2013.01); *C08G 18/4238* (2013.01); *C08G 18/4825* (2013.01); *C08G 18/4829* (2013.01); *C08G 18/7671* (2013.01); *C09J 175/08* (2013.01); *C09J 2301/12* (2020.08); *C09J 2301/30* (2020.08); *C09J 2400/163* (2013.01); *C09J 2423/046* (2013.01); *C09J 2475/00* (2013.01)

(58) Field of Classification Search
CPC .... C09J 175/06; C09J 175/08; C09J 2301/12; C09J 2301/30; C09J 2400/163; C09J 2423/046; C09J 2475/00; C08G 18/12; C08G 18/4018; C08G 18/4238; C08G 18/4825; C08G 18/4829; C08G 18/7671; C08G 18/4202; C08G 18/4288; C08G 18/40; C08G 18/42; C08G 18/48; B32B 2307/31; B32B 5/022; B32B 5/26; B32B 9/02; B32B 9/045; B32B 15/088; B32B 15/14; B32B 2307/732; B32B 2439/70; B32B 9/04; B32B 9/041; B32B 9/047; B32B 15/043; B32B 15/082; B32B 15/085; B32B 15/09; B32B 15/20; B32B 23/04; B32B 23/042; B32B 23/08; B32B 23/10; B32B 27/08; B32B 27/12; B32B 27/302; B32B 27/306; B32B 27/308; B32B 27/32; B32B 27/34; B32B 27/36; B32B 2307/748; B32B 7/12
USPC ................... 156/60, 64, 350, 351, 378, 379
See application file for complete search history.

(56) References Cited

U.S. PATENT DOCUMENTS

| | | |
|---|---|---|
| 4,080,401 A | 3/1978 | Kassner |
| 4,373,085 A | 2/1983 | Bolze et al. |
| 6,288,201 B1 | 9/2001 | Sasano et al. |
| 7,754,334 B2 | 7/2010 | Bushendorf et al. |
| 8,716,427 B2 | 5/2014 | Imai et al. |
| 9,556,369 B2 | 1/2017 | Carter et al. |
| 10,526,460 B2 | 1/2020 | Ferencz et al. |
| 2006/0052523 A1 | 3/2006 | Bushendorf et al. |
| 2006/0074214 A1 | 4/2006 | Kesselmayer et al. |
| 2010/0086712 A1 | 4/2010 | Moller et al. |
| 2012/0018066 A1 | 1/2012 | Xie et al. |
| 2015/0368392 A1 | 12/2015 | Meltzer et al. |
| 2017/0190852 A1 | 7/2017 | Ferencz et al. |
| 2017/0204310 A1 | 7/2017 | Ostlund et al. |

FOREIGN PATENT DOCUMENTS

| | | | |
|---|---|---|---|
| JP | 2003-13032 A | 1/2003 | |
| JP | 2007-332241 A | 12/2007 | |
| WO | 2008/127926 A1 | 10/2008 | |
| WO | 2015/088037 A1 | 6/2015 | |
| WO | WO-2017166005 A1 * | 10/2017 | ............. B32B 15/08 |

\* cited by examiner

*Primary Examiner* — Michael N Orlando
*Assistant Examiner* — Joshel Rivera
(74) *Attorney, Agent, or Firm* — Boyle Fredrickson, S.C.

(57) ABSTRACT

The present disclosure provides a two-component solvent-less adhesive composition. The two-component solvent-less adhesive composition contains the reaction product of (A) an isocyanate component containing the reaction product of (i) an isocyanate monomer and (ii) a first dimer acid polyester polyol; and (B) a polyol component containing (i) a second dimer acid polyester polyol and (ii) optionally, a polyol selected from a polyether polyol, a polyester polyol, and combinations thereof. The two-component solvent-less adhesive composition contains from 15 wt % to 45 wt % units derived from dimer acid, based on the total weight of the two-component solvent-less adhesive composition.

16 Claims, No Drawings

TWO-COMPONENT SOLVENT-LESS ADHESIVE COMPOSITION

BACKGROUND

Laminates are traditionally formed with solvent-based adhesives that require an additional drying step to remove the solvent and form an adhesive layer. The drying step is traditionally accomplished by passing the substrate layers and solvent-based adhesive through an oven at an elevated temperature, which requires additional equipment and processing costs. Attempts have been made to produce laminates with solvent-less adhesives that do not require oven-drying, but these laminates exhibit poor adhesion after chemical aging and/or after high temperature testing such as a boil-in-bag test. These laminates are unsuitable for a number of laminate applications, such as food packaging, which require sufficient adhesion for a period of time after exposure to heat and/or food products. Insufficient adhesion results in defects in the laminate structure, such as bubbling and delamination.

The art recognizes the need for a solvent-less adhesive that exhibits sufficient adhesion between substrates after exposure to heat and/or food products.

SUMMARY

The present disclosure provides a two-component solvent-less adhesive composition. The two-component solvent-less adhesive composition contains the reaction product of (A) an isocyanate component containing the reaction product of (i) an isocyanate monomer and (ii) a first dimer acid polyester polyol; and (B) a polyol component containing (i) a second dimer acid polyester polyol and (ii) optionally, a polyol selected from a polyether polyol, a polyester polyol, and combinations thereof. The two-component solvent-less adhesive composition contains from 15 wt % to 45 wt % units derived from dimer acid, based on the total weight of the two-component solvent-less adhesive composition.

The present disclosure also provides a method of forming a two-component solvent-less adhesive composition. The method includes (A) providing an isocyanate component containing the reaction product of (i) an isocyanate monomer and (ii) a first dimer acid polyester polyol; (B) providing a polyol component containing (i) a second dimer acid polyester polyol and (ii) optionally, a polyol selected from a polyether polyol, a polyester polyol, and combinations thereof; and (C) reacting the isocyanate component with the polyol component to form the two-component solvent-less adhesive composition containing from 15 wt % to 45 wt % units derived from dimer acid, based on the total weight of the two-component solvent-less adhesive composition.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "dicarboxylic acid" is a compound containing two carboxyl (—COOH) groups.

An "isocyanate" is a chemical that contains at least one isocyanate group in its structure. An isocyanate group is represented by the formula: —N═C═O. An isocyanate that contains more than one, or at least two, isocyanate groups is a "polyisocyanate." An isocyanate that has two isocyanate groups is a di-isocyanate and an isocyanate that has three isocyanate groups is a tri-isocyanate, etc. An isocyanate may be aromatic or aliphatic.

A "polyether" is a compound containing two or more ether linkages in the same linear chain of atoms.

A "polyester" is a compound containing two or more ester linkages in the same linear chain of atoms.

A "polyester polyol" is a compound that is a polyester and a polyol.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer" (which is used interchangeably with the term "copolymer") includes bipolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two hydroxyl groups. Nonlimiting examples suitable polyols include diols (which contain two hydroxyl groups), triols (which contain three hydroxyl groups), and multi-hydroxyl containing polyols.

A "solvent-less adhesive" is an adhesive composition that is void of, or substantially void of, a solvent.

Test Methods

Acid value (or acid number) is measured in accordance with ASTM D 1386/7. Acid value is a measure of the amount of carboxylic acid present in a component or a composition. The acid value is the number of milligrams of potassium hydroxide required for the neutralization of free carboxylic acids present in one gram of a substance. Units for acid value are mg KOH/g.

Dimer acid content of the dimer acid polyester polyol is measured in accordance with ASTM D6866, based on renewable content.

Hydroxyl number (OH Number) (or hydroxyl value) is a measure of the number of hydroxyl groups present in a component or a composition. The hydroxyl number is the number of milligrams of potassium hydroxide required to neutralize the hydroxyl groups in one gram of a substance (mg KOH/g). The hydroxyl number is determined in accordance with DIN 53240.

Isocyanate group (NCO) content by weight is measured in accordance with ASTM D2572-97.

Weight average molecular weight (Mw) and number average molecular weight (Mn) are measured using a gel permeation chromatography (GPC) system.

Bond Strength (90° T-Peel Test)

Bond strength is measured in accordance with the 90° hand-assisted T-Peel Test. The laminate is cut into "175 mm×15 mm" strips (each strip had a bond area of "175 mm×15 mm") after curing in an oven at 40° C. and for two days for the initial T-peel bond strength test. Bond strength is also measured after the boil-in-bag test. An Instron 5943 peel tester is set at a 250 mm/min crosshead speed. During testing, the tail of the strip is pulled slightly by finger to make sure the tail remains oriented at 90° to the peeling direction. The average bond strength (Newtons per 15 millimeter (N/15 mm)) is determined from the force versus distance profile. Three samples are tested and the average "bond strength" reported.

Heat Seal Strength

Laminates are heat sealed in a HSG-C Heat-Sealing Machine, available from Brugger Company, under 140° C. seal temperature and 300N pressure for 1 second, are then cooled to room temperature (23° C.) and cut into "175 mm×15 mm" strips (each strip had a heat seal area of "175 mm×15 mm"). A 5940 Series Single Column Table Top System, available from Instron Corporation, set at a crosshead speed of 250 mm/min, is used to measure the heat seal strength of the strip. Three samples are tested and the average "heat seal strength" is reported in Newtons per 15 millimeter (N/15 mm).

Boil-in-Bag

Laminates of 8 inches (20.32 cm)×12 inches (30.48 cm) are folded onto themselves to provide a structure that is 20.32 cm×15.24 cm, the structure having a first side and a second side. Thus, the first side and the second side each is formed from the same laminate. The first substrate (PE film) of the first side is in contact with the first substrate (PE film) of the second side. The structure has four edges, including a fold edge and three open edges. Two of the open edges are heat sealed to form a pouch. Heat sealing occurs at 140° C. for 1 second at a pressure of 300 N/15 mm. Two to three pouches are made from each example.

Each pouch is filled through the remaining open edge with 180 mL of a soup (Morton soup, which is a mixture of bean oil, ketchup, and vinegar with a 1:1:1 mixing ratio). Splashing the soup onto a heat seal area is avoided to prevent heat seal failure. After filling, the open edge is heat sealed in a manner that minimizes air entrapment inside of the closed pouch. Each closed pouch has four closed edges and an interior void that is 18.82 cm×13.74 cm (which is filled with soup). The integrity of each heat seal is visually inspected to ensure there are no flaws in the sealing that would cause the pouch to leak during testing. Pouches with suspected flaws are discarded and replaced.

A pot is filled ⅔ full with water, and brought to a rolling boil. The boiling pot is covered with a lid to minimize water and steam loss. The pot is observed during the test to ensure enough water is present to maintain boiling. The pouches are individually placed in the boiling water, and kept in the boiling water for 30 minutes. The pouches are then removed from the boiling water and visually inspected for tunneling, bubbling, blistering, delamination, and/or leakage.

The pouches are cut open, emptied of soup, and rinsed with soap and water. One or more strips (15 mm×175 mm) of laminate are cut from the pouches (excluding heat seal areas). Bond strength of the laminate is measured in accordance with the 90° T-Peel Test as described above. Heat seal strength of the laminate is measured in accordance with the heat seal strength test described above. Bond strength and heat seal strength are measured as soon as possible after the pouches are emptied of soup. The interior of the pouches are visually inspected for defects.

Isocyanate (NCO) Index

The Isocyanate Index or ("NCO Index") is the molar ratio of isocyanate groups in the isocyanate component to the amount of hydroxyl groups in the dimer acid polyester polyol component. The NCO Index is calculated in accordance with the following Equation (1):

$$NCO\ Index = \frac{(\text{Isocyante Component } NCO\ wt\ \%/42) \times \text{mix ratio}}{(\text{Hydroxyl Value of Polyol Component}/56106)}. \quad \text{Equation (1)}$$

DETAILED DESCRIPTION

The present disclosure provides a two-component solvent-less adhesive composition. The two-component solvent-less adhesive composition contains the reaction product of (A) an isocyanate component containing the reaction product of (i) an isocyanate monomer and (ii) a first dimer acid polyester polyol; and (B) a polyol component containing (i) a second dimer acid polyester polyol and (ii) optionally, a polyol selected from a polyether polyol, a polyester polyol, and combinations thereof. The two-component solvent-less adhesive composition contains from 15 wt % to 45 wt % units derived from dimer acid, based on the total weight of the two-component solvent-less adhesive composition.

A. Isocyanate Component

The two-component solvent-less adhesive composition contains the reaction product of (A) an isocyanate component and (B) a polyol component. The (A) isocyanate component contains the reaction product of (i) an isocyanate monomer and (ii) a first dimer acid polyester polyol.

The (A) isocyanate component is an isocyanate prepolymer. An "isocyanate prepolymer" is the reaction product of an isocyanate monomer and at least one polyol, with the proviso that the at least one polyol includes a dimer acid polyester polyol. An isocyanate prepolymer is a liquid intermediate between monomers and a final polymer.

Isocyanate Monomer

The isocyanate component contains the reaction product of (i) an isocyanate monomer and (ii) a first dimer acid polyester polyol.

An "isocyanate monomer" is a molecule that contains at least two isocyanate groups. The isocyanate monomer may chemically bind to a polyol to form a prepolymer. Nonlimiting examples of suitable isocyanate monomers include aromatic isocyanates, aliphatic isocyanates, carbodiimide modified isocyanate monomers, and the combinations thereof.

An "aromatic isocyanate monomer" is an isocyanate monomer containing one or more aromatic rings. Nonlimiting examples of suitable aromatic isocyanate monomers include isomers of methylene diphenyl dipolyisocyanate (MDI) such as 4,4-MDI, 2,4-MDI and 2,2'-MDI; or modified MDI such as carbodiimide modified MDI or allophanate modified MDI; isomers of toluene-dipolyisocyanate (TDI) such as 2,4-TDI, 2,6-TDI; isomers of naphthalene-dipolyisocyanate (NDI) such as 1,5-NDI; and combinations thereof.

An "aliphatic isocyanate" is an isocyanate in which the isocyanate group (—NCO) is not directly bonded to an aromatic ring. In an embodiment, the aliphatic isocyanate is void of, or contains no, aromatic rings. Nonlimiting examples of suitable aliphatic isocyanate monomers include isomers of hexamethylene dipolyisocyanate (HDI), isomers of isophorone dipolyisocyanate (IPDI), isomers of xylene dipolyisocyanate (XDI), other cycloaliphatic isocyanates such as methylene bis-cyclohexylisocyanate (hydrogenated MDI)(HM DI) and cyclohexane diisocyanate, and combinations thereof.

In an embodiment, the isocyanate monomer is selected from a mono-isocyanate monomer, a di-isocyanate monomer, a tri-isocyanate monomer, and combinations thereof. In a further embodiment, the isocyanate monomer is a di-isocyanate monomer.

In an embodiment, the isocyanate monomer is a multifunctional isocyanate monomer with at least two isocyanate groups, or at least three isocyanate groups.

In an embodiment, the isocyanate monomer is selected from MDI, TDI, HDI, and combinations thereof. In a further embodiment, the isocyanate monomer is MDI.

The isocyanate monomer may comprise two or more embodiments disclosed herein.

Dimer Acid Polyester Polyol

The isocyanate component contains the reaction product of (i) the isocyanate monomer and (ii) a first dimer acid polyester polyol. A "dimer acid polyester polyol" (or "DAPP") is a polyester polyol containing units derived from dimer acid. In an embodiment, the DAPP is the reaction product of (i) dimer acid, (ii) a polyol, and (iii) optionally, a dicarboxylic acid.

i. Dimer Acid

In an embodiment, the DAPP is the reaction product of a reaction mixture including (i) dimer acid, (ii) a polyol, and (iii) optionally, a dicarboxylic acid.

A "dimer acid" is a dicarboxylic acid compound obtained by allowing a fatty acid having from two to four ethylenic double bonds and from 14 to 22 carbon atoms (hereinafter referred to as "Unsaturated Fatty Acid A"), and a fatty acid having from one to four ethylenic double bonds and from 14 to 22 carbon atoms (hereinafter referred to as an "Unsaturated Fatty Acid B"), to react on double bonds in a dimerization reaction. In an embodiment, Unsaturated Fatty Acid A has two ethylenic double bonds and from 14 to 22 carbon atoms, and the Unsaturated Fatty Acid B has one or two ethylenic double bonds and from 14 to 22 carbon atoms. Nonlimiting examples of suitable Unsaturated Fatty Acid A include tetradecadienoic acids, hexadecadienoic acids, octadecadienoic acids (such as linoleic acid), eicosadienoic acids, docosadienoic acids, octadecatrienoic acids (such as linolenic acid), eicosatetraenoic acids (such as arachidonic acid), and combinations thereof. Nonlimiting examples of suitable Unsaturated Fatty Acid B include the above examples, as well as tetradecenoic acids (tsuzuic acid, physeteric acid, myristoleic acid), hexadecenoic acids (such as palmitoleic acid), octadecenoic acids (such as oleic acid, elaidic acid, and vaccenic acid), eicosenoic acids (such as gadoleic acid), and docosenoic acids (such as erucic acid, setoleic acid, and brassidic acid), and combinations thereof.

The obtained dimer acid is a mixture of dimer acids the structures of which differ according to the binding site or isomerization of a double bond. A nonlimiting example of a suitable dimer acid structure is the following Structure (A):

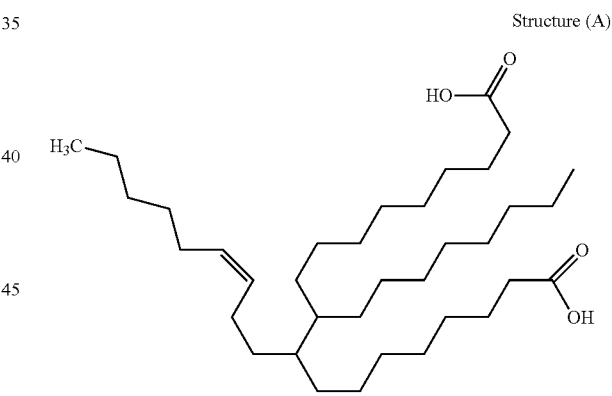

Structure (A)

In an embodiment, the dimer acid is a $C_{36}$ dimer acid. In a further embodiment, the $C_{36}$ dimer acid has the Structure (A).

In an embodiment, the obtained dimer acid includes from 0 wt % to 2 wt %, or 4 wt %, or 6 wt % monomer acid and/or from 0 wt % to 2 wt %, or 4 wt %, or 6 wt % polymer acid having a degree of polymerization greater than, or equal to, the degree of polymerization of a trimer acid.

In an embodiment, the dimer acid is unsaturated. An "unsaturated dimer acid" includes at least one carbon-carbon double bond. Structure (A) is an unsaturated dimer acid. A nonlimiting example of a suitable dimer acid is ATUREX™ 1001 (CAS 61788-89-4), available from Aturex Group.

In an embodiment, the dimer acid has an acid value from 150 mg KOH/g, or 160 mg KOH/g, or 170 mg KOH/g, or 180 mg KOH/g, or 190 mg KOH/g, or 194 mg KOH/g to 200 mg KOH/g, or 210 mg KOH/g, or 220 mg KOH/g, or 230 mg KOH/g, or 240 mg KOH/g, or 250 mg KOH/g. In another embodiment, the dimer acid has an acid value from 150 mg KOH/g to 250 mg KOH/g, or from 180 mg KOH/g to 220 mg KOH/g, or from 190 mg KOH/g to 200 mg KOH/g.

In an embodiment, the dimer acid has the Structure (A) and has an acid value from 150 mg KOH/g to 250 mg KOH/g, or from 180 mg KOH/g to 220 mg KOH/g, or from 190 mg KOH/g to 200 mg KOH/g. In a further embodiment, the dimer acid is ATUREX™ 1001 (CAS 61788-89-4), available from Aturex Group.

The dimer acid may comprise two or more embodiments disclosed herein.

ii. Polyol

In an embodiment, the DAPP is the reaction product of a reaction mixture including (i) dimer acid, (ii) a polyol, and (iii) optionally, a dicarboxylic acid.

Nonlimiting examples suitable polyols include diols (which contain two hydroxyl groups), triols (which contain three hydroxyl groups), and combinations thereof. In an embodiment, the polyol includes a diol and a triol.

In an embodiment, the polyol is a diol. Nonlimiting examples of suitable diols include 3-methyl 1,5-pentane diol (MPD); 2-methyl-1,3-propanediol (MPG); ethylene glycol; butylene glycol; diethylene glycol (DEG); triethylene glycol; polyalkylene glycols, such as polyethylene glycol and polypropylene glycol; 1,2-propanediol; 1,3-propanediol; 1,3-butanediol; 1,4-butanediol; 1,6-hexanediol; and neopentyl glycol (NPG). In an embodiment, the diol is MPD.

A nonlimiting example of a suitable triol is trimethylolpropane (TMP).

The polyol may comprise two or more embodiments disclosed herein.

iii. Optional Dicarboxylic Acid

In an embodiment, the DAPP is the reaction product of a reaction mixture including (i) dimer acid, (ii) the polyol, and (iii) optionally, a dicarboxylic acid.

The (iii) dicarboxylic acid is not a dimer acid. In other words, the (iii) dicarboxylic acid is structurally distinct and/or compositionally distinct from the (i) dimer acid in the reaction mixture.

Nonlimiting examples of suitable dicarboxylic acids include aliphatic acids, aromatic acids, and combinations thereof. Nonlimiting examples of suitable aromatic dicarboxylic acids include phthalic acid, isophthalic acid, and terephthalic acid. Nonlimiting examples of suitable of suitable aliphatic dicarboxylic acids include cyclohexane dicarboxylic acid, adipic acid, azelaic acid, sebacic acid, glutaric acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Saturated aliphatic and/or aromatic acids are also suitable, such as adipic acid or isophthalic acid.

In an embodiment, the dicarboxylic acid has from four, or five, or six to seven, or eight, or nine, or ten carbon atoms. In another embodiment, the dicarboxylic acid has from four to ten carbon atoms, or from six to eight carbon atoms. In a further embodiment, the dicarboxylic acid has eight carbon atoms.

In an embodiment, the dicarboxylic acid is selected from phthalic acid, isophthalic acid, terephthalic acid, and combinations thereof.

The dicarboxylic acid may comprise two or more embodiments disclosed herein.

iv. Optional Additive

In an embodiment, the DAPP is the reaction product of a reaction mixture including (i) dimer acid, (ii) the polyol, (iii) optionally, the dicarboxylic acid, and (iv) optionally, an additive.

Nonlimiting examples of suitable optional additives include adhesion promoters, chain extenders, catalysts, and combinations thereof.

A nonlimiting example of a suitable adhesion promoter is aminosilane.

Nonlimiting examples of suitable chain extenders include glycerine; trimethylol propane; diethylene glycol; propanediol; 2-methyl-1,3-propanediol; and combinations thereof.

Nonlimiting examples of suitable catalysts include tetra-n-butyl titanate, zinc sulphate, organic tin catalyst, and combinations thereof.

In an embodiment, the reaction mixture excludes a chain extender.

The optional additive may comprise two or more embodiments disclosed herein.

iv. Reaction Mixture

In an embodiment, the DAPP is the reaction product of a reaction mixture including (i) dimer acid, (ii) the polyol, (iii) optionally, the dicarboxylic acid, and (iv) optionally, an additive.

In an embodiment, the reaction mixture includes from 15 wt %, or 20 wt %, or 25 wt %, or 30 wt %, or 35 wt % to 40 wt %, or 45 wt %, or 50 wt %, or 55 wt %, or 60 wt %, or 65 wt %, or 70 wt %, or 75 wt %, or 80 wt %, or 85 wt %, or 90 wt % dimer acid, based on the total weight of the reaction mixture. In a further embodiment, the reaction mixture includes from 15 wt % to 90 wt %, or from 25 wt % to 90 wt %, or from 30 wt % to 85 wt % dimer acid, based on the total weight of the reaction mixture.

In an embodiment, the reaction mixture includes from 15 wt %, or 20 wt %, or 25 wt %, or 30 wt %, or 35 wt % to 40 wt %, or 45 wt %, or 50 wt %, or 55 wt %, or 60 wt %, or 65 wt %, or 70 wt %, or 75 wt %, or 80 wt %, or 85 wt %, or 90 wt % dimer acid; and a reciprocal amount of polyol, or from 10 wt %, or 15 wt %, or 20 wt %, or 25 wt %, or 30 wt %, or 35 wt %, or 40 wt %, or 45 wt %, or 50 wt %, or 55 wt %, or 60 wt % to 65 wt %, or 70 wt %, or 75 wt %, or 80 wt %, or 85 wt % polyol, based on the total weight of the reaction mixture.

In an embodiment, the reaction mixture includes from 0 wt %, or 10 wt %, or 15 wt % to 25 wt %, or 30 wt %, or 35 wt %, or 40 wt %, or 45 wt %, or 50 wt % dicarboxylic acid, based on the total weight of the reaction mixture. In another embodiment, the reaction mixture includes from 0 wt % to 50 wt %, or from 10 wt % to 50 wt %, or from 10 wt % to 40 wt %, or from 10 wt % to 25 wt % dicarboxylic acid, based on the total weight of the reaction mixture.

In an embodiment, the reaction mixture includes, consists essentially of, or consists of, based on the total weight of the reaction mixture: (i) from 15 wt % to 90 wt %, or from 25 wt % to 90 wt %, or from 30 wt % to 85 wt % dimer acid; (ii) from 10 wt % to 85 wt %, or from 10 wt % to 75 wt %, or from 15 wt % to 70 wt % polyol; and (iii) optionally, from 0 wt % to 50 wt %, or from 10 wt % to 50 wt %, or from 10 wt % to 40 wt %, or from 10 wt % to 25 wt % dicarboxylic acid; and (iv) optionally, from 0 wt %, or 0.001 wt % to 0.1 wt % catalyst.

It is understood that the sum of the components in each of the components, mixtures, compositions, and layers disclosed herein, including the foregoing reaction mixture, yields 100 weight percent (wt %), based on the total weight of the respective component, mixture, composition, or layer.

The reaction mixture is reacted to form a reaction product that includes the DAPP. The DAPP is the polycondensation reaction product of the reaction mixture. In the polycondensation reaction, the carboxyl groups of the dimer acid (and the optional dicarboxylic acid) react with the hydroxyl groups of the polyol. In an embodiment, the reaction mixture includes a catalyst, such as tetra-n-butyl titanate. The DAPP reaction product is a hydroxyl-terminated polyester with units derived from the dimer acid.

In an embodiment, the DAPP includes from 15 wt %, or 20 wt %, or 25 wt %, or 30 wt %, or 35 wt % to 40 wt %, or 45 wt %, or 50 wt %, or 55 wt %, or 60 wt %, or 65 wt %, or 70 wt %, or 75 wt %, or 80 wt %, or 85 wt %, or 90 wt % units derived from dimer acid, based on the total weight of the DAPP. In a further embodiment, the DAPP includes from 15 wt % to 90 wt %, or from 25 wt % to 90 wt %, or from 30 wt % to 85 wt % units derived from dimer acid, based on the total weight of the DAPP.

In an embodiment, the DAPP has a weight average molecular weight (Mw) from 500 g/mol, or 1000 g/mol to 1500 g/mol, or 2000 g/mol, or 3000 g/mol, or 4000 g/mol, or 5000 g/mol.

In an embodiment, the DAPP has a number average molecular weight (Mn) from 500 g/mol, or 1000 g/mol to 1200 g/mol, or 1500 g/mol, or 2000 g/mol, or 3000 g/mol, or 4000 g/mol, or 5000 g/mol. In another embodiment, the DAPP has a Mn from 500 g/mol to 5000 g/mol, or from 1000 g/mol to 2000 g/mol, or from 1000 g/mol to 1500 g/mol.

In an embodiment, the DAPP has an acid value from 0 mg KOH/g, or 0.01 mg KOH/g to 0.8 mg KOH/g, or less than 1.0 mg KOH/g, or less than 5.0 mg KOH/g. In another embodiment, the DAPP has an acid value from 0 mg KOH/g to less than 5.0 mg KOH/g, or from 0 mg KOH/g to 1.0 mg KOH/g, or from 0 mg KOH/g to 0.8 mg KOH/g.

In an embodiment, the DAPP has an OH Number from 30 mg KOH/g, or 50 mg KOH/g, or 60 mg KOH/g, or 70 mg KOH/g, or 75 mg KOH/g, or 80 mg KOH/g, or 85 mg KOH/g, or 90 mg KOH/g to 120 mg KOH/g, or 130 mg KOH/g, or 140 mg KOH/g, or 150 mg KOH/g. In another embodiment, the DAPP has an OH Number from 30 mg KOH/g to 150 mg KOH/g, or from 90 mg KOH/g to 150 mg KOH/g, or from 90 mg KOH/g to 120 mg KOH/g.

In an embodiment, the first DAPP has one, some, or all of the following properties:
(i) from 15 wt % to 90 wt %, or from 25 wt % to 90 wt %, or from 30 wt % to 85 wt % units derived from dimer acid, based on the total weight of the DAPP; and/or (ii) has a Mw 500 g/mol, or 1000 g/mol to 1500 g/mol, or 2000 g/mol, or 3000 g/mol, or 4000 g/mol, or 5000 g/mol; and/or (iii) has a Mn from 500 g/mol to 5000 g/mol, or from 1000 g/mol to 2000 g/mol, or from 1000 g/mol to 1500 g/mol; and/or (iv) has an acid value from 0 mg KOH/g to less than 5.0 mg KOH/g, or from 0 mg KOH/g to 1.0 mg KOH/g, or from 0 mg KOH/g to 0.8 mg KOH/g; and/or (v) has an OH Number from 30 mg KOH/g to 150 mg KOH/g, or from 75 mg KOH/g to 150 mg KOH/g, or from 90 mg KOH/g to 150 mg KOH/g, or from 90 mg KOH/g to 120 mg KOH/g.

In an embodiment, the DAPP contains from 15 wt % to 90 wt %, or from 25 wt % to 90 wt %, or from 30 wt % to 85 wt % units derived from dimer acid, based on the total weight of the DAPP; and the DAPP has an OH Number from 30 mg KOH/g to 150 mg KOH/g, or from 75 mg KOH/g to 150 mg KOH/g, or from 90 mg KOH/g to 150 mg KOH/g, or from 90 mg KOH/g to 120 mg KOH/g.

The reaction mixture may comprise two or more embodiments disclosed herein.

The DAPP may comprise two or more embodiments disclosed herein.

Optional Polyol

In an embodiment, the isocyanate component contains the reaction product of (i) the isocyanate monomer, (ii) the first DAPP, and (iii) an optional polyol.

The optional polyol may be any polyol disclosed herein, with the proviso that the optional polyol is compositionally distinct and/or structurally distinct from the first DAPP.

In an embodiment, the polyol is selected from a polyether polyol, a polyester polyol, and a combination thereof.

i. Polyester Polyol

In an embodiment, the isocyanate component contains the reaction product of (i) the isocyanate monomer, (ii) the first DAPP, and (iii) an optional polyol that is a polyester polyol.

The polyester polyol is compositionally distinct and/or structurally distinct from the first DAPP. In an embodiment, the polyester polyol is a DAPP that is compositionally distinct and/or structurally distinct from the first DAPP. In another embodiment, the polyester polyol excludes DAPP.

Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxycarboxylic acids, lactones, and combinations thereof. The polyester polyols can also be derived from, instead of the free polycarboxylic acids, the corresponding polycarboxylic anhydrides, or corresponding polycarboxylic esters of lower alcohols.

Nonlimiting examples of suitable diols include ethylene glycol; butylene glycol; diethylene glycol (DEG); triethylene glycol; polyalkylene glycols, such as polyethylene glycol; 1,2-propanediol; 1,3-propanediol; 1,3-butanediol; 1,4-butanediol; 1,6-hexanediol; and neopentyl glycol (NPG).

Nonlimiting examples of suitable dicarboxylic acids include aliphatic acids, aromatic acids, and combinations thereof. Nonlimiting examples of suitable aromatic acids include phthalic acid, isophthalic acid, and terephthalic acid. Nonlimiting examples of suitable of suitable aliphatic acids include cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Saturated aliphatic and/or aromatic acids are also suitable, such as adipic acid or isophthalic acid.

The polyester polyol may comprise two or more embodiments disclosed herein.

ii. Polyether Polyol

In an embodiment, the isocyanate component contains the reaction product of (i) the isocyanate monomer, (ii) the first DAPP, and (iii) an optional polyol that is a polyether polyol.

A "polyether polyol" is a compound that is a polyether and a polyol. Nonlimiting examples of suitable polyether polyols include polyaddition products of ethylene oxide, propylene oxide, tetrahydrofuran, butylene oxide, and the co-addition and grafted products thereof; the polyether polyols obtained by condensation of polyhydric alcohols, or mixtures thereof; and combination thereof.

Nonlimiting examples of suitable polyether polyols include polypropylene glycol (PPG), polyethylene glycol (PEG), polybutylene glycol, polytetramethylene ether glycol (PTMEG), and combinations thereof. In an embodiment, the polyether polyol is polypropylene glycol (PPG).

Nonlimiting examples of suitable polyether polyols include VORANOL™ 1010 L, a PPG; and VORANOL™ CP450, a glycerine propoxylated polyether triol, each available from The Dow Chemical Company.

In an embodiment, the polyether polyol has a Mw from 50 g/mol, or 100 g/mol, or 400 g/mol, or 450 g/mol to 1,000 g/mol, or 1,500 g/mol, or 2,000 g/mol, or 4,000 g/mol, or 5,000 g/mol.

In an embodiment, the polyether polyol has an OH Number from 30 mg KOH/g, or 50 mg KOH/g, or 75 mg KOH/g, or 100 mg KOH/g to 115 mg KOH/g, or 125 mg KOH/g, or 150 mg KOH/g, or 200 mg KOH/g, or 300 mg KOH/g, or 350 mg KOH/g, or 400 mg KOH/g, or 450 mg KOH/g, or 500 mg KOH/g.

In an embodiment, the polyether polyol has one or both of the following properties:
  (i) a Mw from 50 g/mol to 5,000 g/mol, or from 100 g/mol to 2,000 g/mol, or from 400 g/mol to 1,500 g/mol, or from 400 g/mol to 1,000 g/mol; and/or (ii) an OH Number from 30 mg KOH/g to 500 mg KOH/g, or from 100 mg KOH/g to 400 mg KOH/g, or from 100 mg KOH/g to 150 mg KOH/g, or from 350 mg KOH/g to 400 mg KOH/g.

The polyether polyol may comprise two or more embodiments disclosed herein.

Optional Catalyst

In an embodiment, the isocyanate component contains the reaction product of (i) the isocyanate monomer, (ii) the first DAPP, (iii) the optional polyol, and (iv) an optional catalyst.

Nonlimiting examples of suitable catalysts include dibutyltin dilaurate, zinc acetate, 2,2-dimorpholinodiethylether, and combinations thereof.

In an embodiment, the isocyanate component is formed from the reaction product of an isocyanate composition containing from 10 wt %, or 20 wt %, or 30 wt %, or 40 wt %, or 45 wt %, or 50 wt %, or 51 wt % to 55 wt %, or 60 wt %, or 65 wt %, or 70 wt %, or 80 wt %, or 85 wt %, or 90 wt % isocyanate monomer, based on the total weight of the isocyanate composition. In a further embodiment, the isocyanate component is formed from the reaction product of an isocyanate composition containing from 10 wt % to 90 wt %, or from 10 wt % to 80 wt %, or from 20 wt % to 70 wt %, or from 30 wt % to 70 wt %, or from 40 wt % to 70 wt %, or from 45 wt % to 90 wt %, or from 50 wt % to 60 wt %, or from 50 wt % to 55 wt %, or from 51 wt % to 80 wt % isocyanate monomer, based on the total weight of the isocyanate composition.

In an embodiment, the isocyanate component is formed from the reaction product of an isocyanate composition containing from 10 wt %, or 15 wt %, or 20 wt %, or 30 wt %, or 40 wt %, or 45 wt %, or 50 wt % to 55 wt %, or 60 wt %, or 65 wt %, or 70 wt %, or 80 wt % DAPP, based on the total weight of the isocyanate composition. In a further embodiment, the isocyanate component is formed from the reaction product of an isocyanate composition containing from 10 wt % to 80 wt %, or from 10 wt % to 70 wt %, or from 10 wt % to 60 wt %, or from 15 wt % to 60 wt %, or from 15 wt % to 50 wt %, or from 10 wt % to 55 wt %, or from 15 wt % to less than 50 wt % DAPP, based on the total weight of the isocyanate composition.

In an embodiment, the isocyanate component is formed from the reaction product of an isocyanate composition containing from 0 wt %, or 1 wt %, or 5 wt %, or 10 wt %, or 15 wt % to 20 wt %, or 25 wt %, or 30 wt % optional polyol, based on the total weight of the isocyanate composition. In another embodiment, the isocyanate component is formed from the reaction product of an isocyanate composition containing from 0 wt % to 30 wt %, or from 1 wt % to 30 wt %, or from 5 wt % to 30 wt %, or from 10 wt % to 30 wt %, or from 15 wt % to 30 wt % optional polyol, based on the total weight of the isocyanate composition.

In an embodiment, the isocyanate component is formed from the reaction product of an isocyanate composition containing, consisting essentially of, or consisting of: (i) from 10 wt % to 90 wt %, or from 10 wt % to 80 wt %, or from 20 wt % to 70 wt %, or from 30 wt % to 70 wt %, or from 40 wt % to 70 wt %, or from 45 wt % to 90 wt %, or from 50 wt % to 60 wt %, or from 50 wt % to 55 wt %, or from 51 wt % to 80 wt % isocyanate monomer; (ii) from 10 wt % to 80 wt %, or from 10 wt % to 70 wt %, or from 10 wt % to 60 wt %, or from 15 wt % to 60 wt %, or from 15 wt % to 50 wt %, or from 10 wt % to 55 wt %, or from 15 wt % to less than 50 wt % first DAPP; (iii) optionally, from 0 wt % to 30 wt %, or from 1 wt % to 30 wt %, or from 5 wt % to 30 wt %, or from 10 wt % to 30 wt %, or from 15 wt % to 30 wt % polyol, based on the total weight of the isocyanate composition; and (iv) optionally, a catalyst.

In an embodiment, the isocyanate component has an NCO Content from 10 wt %, or 11 wt %, or 12 wt %, or 13 wt %, or 14 wt % to 15 wt %, or 16 wt %, or 20 wt %, based on the total weight of the isocyanate component.

In an embodiment, the isocyanate component is formed from the reaction product of an isocyanate composition containing, consisting essentially of, or consisting of (i) from 45 wt % to 90 wt % isocyanate monomer, (ii) from 10 wt % to 55 wt % first DAPP, and (iii) from 0 wt % to 30 wt % optional polyol, based on the total weight of the isocyanate composition. In a further embodiment, the isocyanate component has an NCO Content from 10 wt %, or 11 wt %, or 12 wt %, or 13 wt %, or 14 wt % to 15 wt %, or 16 wt %, or 20 wt %, based on the total weight of the isocyanate component.

The isocyanate component may comprise two or more embodiments disclosed herein.

B. Polyol Component

The two-component solvent-less adhesive composition contains the reaction product of (A) the isocyanate component; and (B) a polyol component. The polyol component contains (i) a second dimer acid polyester polyol and (ii) optionally, a polyol selected from a polyether polyol, a polyester polyol, and combinations thereof.

In an embodiment, the polyol component consists of (i) the second DAPP.

In an embodiment, the polyol component is a blend of (i) the second DAPP and (ii) the polyol.

Second Dimer Acid Polyester Polyol

The polyol component contains (i) a second dimer acid polyester polyol and (ii) optionally, a polyol selected from a polyether polyol, a polyester polyol, and combinations thereof.

The second DAPP may be any DAPP disclosed herein.

The second DAPP may be the same or different than the first DAPP. In an embodiment, the first DAPP is compositionally different and/or structurally different than the second DAPP.

In an embodiment, the first DAPP is the same as the second DAPP. A first DAPP that is the same as the second DAPP has an identical composition and an identical structure as the second DAPP.

The second DAPP may comprise two or more embodiments disclosed herein.

Polyol

In an embodiment, the polyol component contains (i) the second DAPP and (ii) a polyol selected from a polyether polyol, a polyester polyol, and combinations thereof.

i. Polyether Polyol

In an embodiment, the polyol component contains (i) the second DAPP and (ii) a polyol that is a polyether polyol.

The polyether polyol may be any polyether polyol disclosed herein.

The polyether polyol may be the same or different than the optional polyol in the isocyanate component. In an embodiment, the polyether polyol is compositionally different and/or structurally different than the optional polyol in the isocyanate component.

In an embodiment, the polyether polyol is the same as the optional polyol in the isocyanate component. A polyether polyol that is the same as the optional polyol in the isocyanate component has an identical composition and an identical structure as the optional polyol in the isocyanate component.

The polyether polyol may comprise two or more embodiments disclosed herein.

ii. Polyester Polyol

In an embodiment, the polyol component contains (i) the second DAPP and (ii) a polyol that is a polyester polyol.

The polyester polyol may be any polyester polyol disclosed herein, with the proviso that the polyester polyol is compositionally distinct and/or structurally distinct from the second DAPP.

The polyester polyol is compositionally distinct and/or structurally distinct from the second DAPP. In an embodiment, the polyester polyol is a DAPP that is compositionally distinct and/or structurally distinct from the second DAPP. In another embodiment, the polyester polyol excludes DAPP.

The polyester polyol may comprise two or more embodiments disclosed herein.

In an embodiment, the polyol component contains from 10 wt %, or 20 wt %, or 25 wt %, or 30 wt %, or 35 wt % to 40 wt %, or 45 wt %, or 50 wt %, or 75 wt %, or 90 wt %, or 100 wt % second DAPP, based on the total weight of the polyol component. In another embodiment, the polyol component contains from 10 wt % to 100 wt %, or from 10 wt % to 50 wt %, or from 10 wt % to 45 wt %, or from 20 wt % to 45 wt %, or from 30 wt % to 45 wt %, or from 35 wt % to 40 wt % second DAPP, based on the total weight of the polyol component.

In an embodiment, the polyol component contains from 10 wt %, or 20 wt %, or 25 wt %, or 30 wt %, or 35 wt % to 40 wt %, or 45 wt %, or 50 wt % second DAPP; and a reciprocal amount of polyol selected from polyether polyol, polyester polyol, and combinations thereof; or from 50 wt %, or 55 wt %, or 60 wt % to 65 wt %, or 70 wt %, or 75 wt %, or 80 wt %, or 90 wt % polyol selected from polyether polyol, polyester polyol, and combinations thereof, based on the total weight of the polyol component. In another embodiment, the polyol component contains from 50 wt % to 90 wt %, or from 55 wt % to 90 wt %, or from 50 wt % to 80 wt %, or from 55 wt % to 75 wt %, or from 55 wt % to 65 wt % polyol selected from polyether polyol, polyester polyol, and combinations thereof, based on the total weight of the polyol component.

In an embodiment, the polyol component has a hydroxyl value from 180 mg KOH/g, or 250 mg KOH/g, or 260 mg KOH/g, or 265 mg KOH/g to 272 mg KOH/g, or 275 mg KOH/g, or 300 mg KOH/g, or 400 mg KOH/g.

In an embodiment, the polyol component contains, consists essentially of, or consists of: (i) from 10 wt % to 50 wt %, or from 10 wt % to 45 wt %, or from 20 wt % to 45 wt %, or from 30 wt % to 45 wt %, or from 35 wt % to 40 wt % second DAPP; and (ii) from 50 wt % to 90 wt %, or from 55 wt % to 90 wt %, or from 50 wt % to 80 wt %, or from 55 wt % to 75 wt %, or from 55 wt % to 65 wt % polyol selected from polyether polyol, polyester polyol, and combinations thereof, based on the total weight of the polyol component. In a further embodiment, the polyol component has a hydroxyl value from 250 mg KOH/g, or 260 mg KOH/g, or 265 mg KOH/g to 275 mg KOH/g, or 300 mg KOH/g.

The polyol component may comprise two or more embodiments disclosed herein.

C. Two-Component Solvent-Less Adhesive Composition

The two-component solvent-less adhesive composition contains the reaction product of (A) the isocyanate component and (B) the polyol component. The two-component solvent-less adhesive composition contains from 15 wt % to 45 wt % units derived from dimer acid, based on the total weight of the two-component solvent-less adhesive composition.

The two-component solvent-less adhesive composition is void of, or substantially void of, a solvent.

In an embodiment, the two-component solvent-less adhesive composition contains an optional additive. The optional additive may be any optional additive disclosed herein.

The two-component solvent-less adhesive composition is formed by mixing (A) the isocyanate component and (B) the polyol component under conditions suitable to react the —NCO groups of the isocyanate component with the hydroxyl groups of the polyol component. In an embodiment, (A) the isocyanate component and (B) the polyol component are combined and mixed via static mixing equipment or dynamic mixing equipment (such as a meter-mix-dispenser) at a temperature from 15° C., or 20° C., or 25° C., or 30° C., or 35° C., or 40° C. to 45° C., or 50° C., or 55° C.

The two-component solvent-less adhesive composition contains from 15 wt % to 45 wt % units derived from dimer acid, based on the total weight of the two-component solvent-less adhesive composition. In an embodiment, the two-component solvent-less adhesive composition contains from 15 wt %, or 16 wt %, or 17 wt %, or 18 wt %, or 19 wt % to 20 wt %, or 25 wt %, or 30 wt %, or 34 wt %, or 35 wt %, or 40 wt %, or 45 wt % units derived from dimer acid, based on the total weight of the two-component solvent-less adhesive composition. In another embodiment, the two-component solvent-less adhesive composition contains from 15 wt % to 40 wt %, or from 15 wt % to 35 wt %, or from 16 wt % to 35 wt %, or from 16 wt % to 33 wt % units derived from dimer acid, based on the total weight of the two-component solvent-less adhesive composition.

In an embodiment, the two-component solvent-less adhesive composition has an NCO Index from 1.0, or 1.4, or 1.5, or 1.6 to 1.7, or 1.8. In another embodiment, the two-component solvent-less adhesive composition has an NCO Index from 1.0 to 1.8, or from 1.4 to 1.8, or from 1.5 to 1.8, or from 1.6 to 1.8, or from 1.6 to 1.7.

In an embodiment, the two-component solvent-less adhesive composition includes (A) the isocyanate component and (B) the polyol component at an Isocyanate Component:

Polyol Component Weight Ratio from 100:30 to 100:100, or from 100:30 to 100:60, or from 100:40 to 100:60, or from 100:40 to 100:45.

In an embodiment, the two-component solvent-less adhesive composition contains, consists essentially of, or consists of, the reaction product of: (A) an isocyanate component containing an isocyanate prepolymer that is the reaction product of an isocyanate composition containing, consisting essentially of, or consisting of: (i) from 10 wt % to 90 wt %, or from 10 wt % to 80 wt %, or from 20 wt % to 70 wt %, or from 30 wt % to 70 wt %, or from 40 wt % to 70 wt %, or from 45 wt % to 90 wt %, or from 50 wt % to 60 wt %, or from 50 wt % to 55 wt %, or from 51 wt % to 80 wt % isocyanate monomer; (ii) from 10 wt % to 80 wt %, or from 10 wt % to 70 wt %, or from 10 wt % to 60 wt %, or from 15 wt % to 60 wt %, or from 15 wt % to 50 wt %, or from 10 wt % to 55 wt %, or from 15 wt % to less than 50 wt % of the first DAPP; (iii) optionally, from 0 wt % to 30 wt %, or from 1 wt % to 30 wt %, or from 5 wt % to 30 wt %, or from 10 wt % to 30 wt %, or from 15 wt % to 30 wt % polyol, based on the total weight of the isocyanate composition; and
- (iv) optionally, a catalyst; (B) a polyol component containing, consisting essentially of, or consisting of: (i) from 10 wt % to 100 wt %, or from 10 wt % to 50 wt %, or from 10 wt % to 45 wt %, or from 20 wt % to 45 wt %, or from 30 wt % to 45 wt %, or from 35 wt % to 40 wt % of the second DAPP; and (ii) optionally, from 50 wt % to 90 wt %, or from 55 wt % to 90 wt %, or from 50 wt % to 80 wt %, or from 55 wt % to 75 wt %, or from 55 wt % to 65 wt % polyol selected from polyether polyol, polyester polyol, and combinations thereof, based on the total weight of the polyol component; and the two-component solvent-less adhesive composition contains from 15 wt % to 40 wt %, or from 15 wt % to 35 wt %, or from 16 wt % to 35 wt %, or from 16 wt % to 33 wt % units derived from dimer acid, based on the total weight of the two-component solvent-less adhesive composition; and the first DAPP and the second DAPP are the same, and each is the reaction product of a reaction mixture containing, consisting essentially of, or consisting of: (i) from 15 wt % to 90 wt %, or from 25 wt % to 90 wt %, or from 30 wt % to 85 wt % dimer acid; (ii) from 10 wt % to 85 wt %, or from 10 wt % to 75 wt %, or from 15 wt % to 70 wt % polyol; and (iii) optionally, from 0 wt % to 50 wt %, or from 10 wt % to 50 wt %, or from 10 wt % to 40 wt %, or from 10 wt % to 25 wt % dicarboxylic acid; and (iv) optionally, from 0 wt %, or 0.001 wt % to 0.1 wt % catalyst, based on the total weight of the reaction mixture; and the first DAPP and the second DAPP each has one, some, or all of the following properties:
- (i) from 15 wt % to 90 wt %, or from 25 wt % to 90 wt %, or from 30 wt % to 85 wt % units derived from dimer acid, based on the total weight of the DAPP; and/or (ii) has a Mw from 500 g/mol, or 1000 g/mol to 1500 g/mol, or 2000 g/mol, or 3000 g/mol, or 4000 g/mol, or 5000 g/mol and/or
- (iii) has a Mn from 500 g/mol to 5000 g/mol, or from 1000 g/mol to 2000 g/mol, or from 1000 g/mol to 1500 g/mol; and/or (iv) has an acid value from 0 mg KOH/g to less than 5.0 mg KOH/g, or from 0 mg KOH/g to 1.0 mg KOH/g, or from 0 mg KOH/g to 0.8 mg KOH/g; and/or (v) has an OH Number from 30 mg KOH/g to 150 mg KOH/g, or from 75 mg KOH/g to 150 mg KOH/g, or from 90 mg KOH/g to 150 mg KOH/g, or from 90 mg KOH/g to 120 mg KOH/g; and the two-component solvent-less adhesive composition has one or both of the following properties: (i) an NCO Index from 1.0 to 1.8, or from 1.4 to 1.8, or from 1.5 to 1.8, or from 1.6 to 1.8, or from 1.6 to 1.7; and/or (ii) an Isocyanate Component:Polyol Component Weight Ratio from 100:30 to 100:100, or from 100:30 to 100:60, or from 100:40 to 100:60, or from 100:40 to 100:45.

The two-component solvent-less adhesive composition may comprise two or more embodiments disclosed herein.

E. Laminate

The present disclosure provides a laminate. The laminate includes a first substrate, a second substrate, and an adhesive layer between the first substrate and the second substrate. The adhesive layer is formed from the two-component solvent-less adhesive composition.

The two-component solvent-less adhesive composition may be any two-component solvent-less adhesive composition disclosed herein.

First Substrate and Second Substrate

The laminate includes a first substrate and a second substrate.

The first substrate and the second substrate may be the same or different. In an embodiment, the first substrate and the second substrate are the same, such that they have the identical compositions and identical structures.

In an embodiment, the first substrate and the second substrate are compositionally distinct and/or structurally distinct from one another.

It is understood that the below description referring to a "substrate" refers to the first substrate and the second substrate, individually and/or collectively.

A nonlimiting example of a suitable substrate is a film. The film may be a monolayer film or a multilayer film. The multilayer film contains two layers, or more than two layers. For example, the multilayer film can have two, three, four, five, six, seven, eight, nine, ten, eleven, or more layers. In an embodiment, the multilayer film contains only two layers, or only three layers.

In an embodiment, the film is a monolayer film with one, and only one, layer.

In an embodiment, the film includes a layer containing a component selected from ethylene-based polymer (PE), propylene-based polymer (PP), polyamide (such as nylon), polyester, ethylene vinyl alcohol (EVOH) copolymer, polyethylene terephthalate (PET), ethylene vinyl acrylate (EVA) copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polylactic acid (PLA), a polystyrene, a metal foil, a cellulose, cellophane, nonwoven fabric, and combinations thereof. A nonlimiting example of a suitable metal foil is aluminum foil. Each layer of a multilayer film may for formed from the same component, or from different components.

In an embodiment, the film includes a layer containing metal foil.

In an embodiment, the film is a monolayer film having a single layer that is an ethylene-based polymer layer. In a further embodiment, the film is a monolayer film having a single layer that is a polyethylene layer.

The substrate, and further the film, is a continuous structure with two opposing surfaces.

In an embodiment, the substrate has a thickness from 5 μm, or 10 μm, or 12 μm, or 15 μm, or 20 μm, or 21 μm to 23 μm, or 24 μm, or 25 μm, or 30 μm, or 35 μm, or 40 μm, or 45 μm, or 50 μm, or 100 μm, or 150 μm, or 200 μm, or 250 μm, or 300 μm, or 350 μm, or 400 μm, or 450 μm, or 500 μm.

In an embodiment, the substrate excludes cellulose-based substrates, such as paper and wood.

In an embodiment, the first substrate is a monolayer film having a single layer that is a PE layer; and the second substrate is a film having a layer that is a metal foil layer.

The film may comprise two or more embodiments disclosed herein.

The first substrate may comprise two or more embodiments disclosed herein.

The second substrate may comprise two or more embodiments disclosed herein.

The two-component solvent-less adhesive composition is applied between the first substrate and the second substrate, such as with a Nordmeccanica Labo Combi 400 laminator. In an embodiment, the two-component solvent-less adhesive composition is applied between the first substrate and the second substrate at a temperature from 20° C., or 30° C., or 40° C. to 50° C., or 60° C., or 70° C., or 80° C., or 90° C.

Nonlimiting examples of suitable application methods include brushing, pouring, spraying, coating, rolling, spreading, and injecting.

In an embodiment, the two-component solvent-less adhesive composition is applied between the first substrate and the second substrate at a coat weight from 0.8 grams per square meter ($g/m^2$), or 1.0 $g/m^2$, or 1.5 $g/m^2$, or 1.8 $g/m^2$ to 2.0 $g/m^2$; or 2.5 $g/m^2$. In another embodiment, the two-component solvent-less adhesive composition is applied between the first substrate and the second substrate at a coat weight from 0.8 $g/m^2$ to 2.5 $g/m^2$, or from 1.0 $g/m^2$ to 2.5 $g/m^2$, or from 1.5 $g/m^2$ to 2.0 $g/m^2$, or from 1.8 $g/m^2$ to 2.0 $g/m^2$.

In an embodiment, the two-component solvent-less adhesive composition is uniformly applied between the first substrate and the second substrate. A "uniform application" is a layer of the composition that is continuous (not intermittent) across a surface of the substrate, and of the same, or substantially the same, thickness across the surface of the substrate. In other words, a composition that is uniformly applied to a substrate directly contacts the substrate surface, and the composition is coextensive with the substrate surface.

The two-component solvent-less adhesive composition and the first substrate are in direct contact with each other. The term "directly contacts," as used herein, is a layer configuration whereby a substrate is located immediately adjacent to a two-component solvent-less adhesive composition, or an adhesive layer and no intervening layers, or no intervening structures, are present between the substrate and the two-component solvent-less adhesive composition, or the an adhesive layer. The two-component solvent-less adhesive composition directly contacts a surface of the first substrate.

The two-component solvent-less adhesive composition and the second substrate are in direct contact with each other. The two-component solvent-less adhesive composition directly contacts a surface of the second substrate.

The structure containing the first substrate, the second substrate, and the two-component solvent-less adhesive composition has the following Structure (B):

First Substrate/Two-Component Solvent-Less Adhesive Composition/Second Substrate Structure (B).

The adhesive layer of Structure (B) is formed from curing the two-component solvent-less adhesive composition. The two-component solvent-less adhesive composition is formed from mixing and reacting the (A) isocyanate component and the (B) polyol component.

In an embodiment, the two-component solvent-less adhesive composition is cured in an oven at a temperature from 30° C., or 35° C. to 40° C., or 45° C., or 50° C.

In an embodiment, the two-component solvent-less adhesive composition is cured at a temperature from 20° C. to 25° C. for a period of from 1 day to 2 days, or 4 days, or 7 days.

In an embodiment, the two-component solvent-less adhesive composition is cured in the absence, or in the substantial absence, of a photo-initiator.

In an embodiment, the two-component solvent-less adhesive composition is cured in the absence, or in the substantial absence, of water.

In an embodiment, the Structure (B) is cured to form an adhesive layer between the first substrate and the second substrate, thereby forming a laminate. The laminate has the following Structure (C):

First Substrate/Adhesive Layer/Second Substrate Structure (C).

The laminate includes the first substrate in direct contact with the adhesive layer, and the second substrate in direct contact with the adhesive layer.

The laminate includes alternating substrate layers and adhesive layers. The laminate includes at least three total layers, total layers including the substrate layers and the adhesive layers. In an embodiment, the laminate includes from three to four, or five, or six, or seven, or eight, or nine, or ten total layers.

In an embodiment, the first substrate is a monolayer film having a single layer that is a PE layer and the second substrate is a film having a layer that is a metal foil layer, and the laminate has an initial bond strength from 3 N/15 mm, or 5 N/15 mm, or 7 N/15 mm to 12 N/15 mm, or 15 N/15 mm, or 20 N/15 mm.

In an embodiment, the first substrate is a monolayer film having a single layer that is a PE layer and the second substrate is a film having a layer that is a metal foil layer, and the laminate has a bond strength after the boil-in-bag test from 1.0 N/15 mm, or 5.0 N/15 mm, or 6.0 N/15 mm to 11.0 N/15 mm, or 12.0 N/15 mm, or 13 N/15 mm, or 15 N/15 mm. In another embodiment, the laminate has a bond strength after the boil-in-bag test from 1.0 N/15 mm to 15 N/15 mm, or from 5.0 N/15 mm to 15 N/15 mm, or from 6.0 N/15 mm to 11.0 N/15 mm.

In an embodiment, the first substrate is a monolayer film having a single layer that is a PE layer and the second substrate is a film having a layer that is a metal foil layer, and the laminate has an initial heat seal strength from 20 N/15 mm, or 25 N/15 mm, or 30 N/15 mm, or 35 N/15 mm, or 40 N/15 mm, or 45 N/15 mm, or 50 N/15 mm, or 52 N/15 mm to 55 N/15 mm, or 60 N/15 mm, or 70 N/15 mm, or 75 N/15 mm, or 100 N/15 mm. In another embodiment, the laminate has an initial heat seal strength from 20 N/15 mm to 100 N/15 mm, or from 40 N/15 mm to 100 N/15 mm, or from 50 N/15 mm to 100 N/15 mm, or from 52 N/15 mm to 100 N/15 mm, or from 50 N/15 mm to 75 N/15 mm.

In an embodiment, the first substrate is a monolayer film having a single layer that is a PE layer and the second substrate is a film having a layer that is a metal foil layer, and the laminate has a heat seal strength after the boil-in-bag test from 20 N/15 mm, or 25 N/15 mm, or 28 N/15 mm, or 30 N/15 mm to 49 N/15 mm, or 50 N/15 mm, or 55 N/15 mm, or 60 N/15 mm, or 65 N/15 mm, or 70 N/15 mm, or 75 N/15 mm. In another embodiment, the laminate has a heat seal strength after the boil-in-bag test from 20 N/15 mm to 35 N/15 mm, or from 25 N/15 mm to 75 N/15 mm, or from 30 N/15 mm to 75 N/15 mm, or from 30 N/15 mm to 50 N/15 mm.

In an embodiment, the first substrate is a monolayer film having a single layer that is a PE layer and the second substrate is a film having a layer that is a metal foil layer, and the laminate does not delaminate after the boil-in-bag test.

In an embodiment, the laminate includes, consists essentially of, or consists of: a first substrate that is a monolayer film having a single layer that is a PE layer; a second substrate that is a film having a layer that is a metal foil layer; and an adhesive layer between the first substrate and the second substrate, the adhesive layer in direct contact with the metal foil layer and the PE layer, the adhesive layer formed from a two-component solvent-less adhesive composition containing, consisting essentially of, or consisting of the reaction product of:

(A) an isocyanate component containing an isocyanate prepolymer that is the reaction product of an isocyanate composition containing, consisting essentially of, or consisting of: (i) from 10 wt % to 90 wt %, or from 10 wt % to 80 wt %, or from 20 wt % to 70 wt %, or from 30 wt % to 70 wt %, or from 40 wt % to 70 wt %, or from 45 wt % to 90 wt %, or from 50 wt % to 60 wt %, or from 50 wt % to 55 wt %, or from 51 wt % to 80 wt % isocyanate monomer; (ii) from 10 wt % to 80 wt %, or from 10 wt % to 70 wt %, or from 10 wt % to 60 wt %, or from 15 wt % to 60 wt %, or from 15 wt % to 50 wt %, or from 10 wt % to 55 wt %, or from 15 wt % to less than 50 wt % of the first DAPP; (iii) optionally, from 0 wt % to 30 wt %, or from 1 wt % to 30 wt %, or from 5 wt % to 30 wt %, or from 10 wt % to 30 wt %, or from 15 wt % to 30 wt % polyol, based on the total weight of the isocyanate composition; and (iv) optionally, a catalyst;

(B) a polyol component containing, consisting essentially of, or consisting of: (i) from 10 wt % to 100 wt %, or from 10 wt % to 50 wt %, or from 10 wt % to 45 wt %, or from 20 wt % to 45 wt %, or from 30 wt % to 45 wt %, or from 35 wt % to 40 wt % of the second DAPP; and (ii) optionally, from 50 wt % to 90 wt %, or from 55 wt % to 90 wt %, or from 50 wt % to 80 wt %, or from 55 wt % to 75 wt %, or from 55 wt % to 65 wt % polyol selected from polyether polyol, polyester polyol, and combinations thereof, based on the total weight of the polyol component; and the two-component solvent-less adhesive composition contains 15 wt % to 40 wt %, or from 15 wt % to 35 wt %, or from 16 wt % to 35 wt %, or from 16 wt % to 33 wt % units derived from dimer acid, based on the total weight of the two-component solvent-less adhesive composition, and has one or both of the following properties: (i) an NCO Index from 1.0 to 1.8, or from 1.4 to 1.8, or from 1.5 to 1.8, or from 1.6 to 1.8, or from 1.6 to 1.7; and/or (ii) an Isocyanate Component:Polyol Component Weight Ratio from 100:30 to 100:100, or from 100:40 to 100:60, or from 100:40 to 100:45;

wherein the laminate has one, some, or all of the following properties: (A) an initial bond strength from 3 N/15 mm to 20 N/15 mm, or from 5 N/15 mm to 15 N/15 mm, or from 7 N/15 mm to 13 N/15 mm; and/or (B) a bond strength after the boil-in-bag test from 1.0 N/15 mm to 15 N/15 mm, or from 5.0 N/15 mm to 15 N/15 mm, or from 6.0 N/15 mm to 11.0 N/15 mm; and/or (C) an initial heat seal strength from 20 N/15 mm to 100 N/15 mm, or from 40 N/15 mm to 100 N/15 mm, or from 50 N/15 mm to 100 N/15 mm, or from 52 N/15 mm to 100 N/15 mm, or from 50 N/15 mm to 75 N/15 mm; and/or (D) a heat seal strength after the boil-in-bag test from 20 N/15 mm to 35 N/15 mm, or from 25 N/15 mm to 75 N/15 mm, or from 30 N/15 mm to 75 N/15 mm, or from 30 N/15 mm to 50 N/15 mm; and/or (E) the laminate does not delaminate after the boil-in-bag test The laminate may comprise two or more embodiments disclosed herein.

F. Method of Forming a Two-Component Solvent-Less Adhesive Composition

The present disclosure also provides a method of forming the two-component solvent-less adhesive composition.

In an embodiment, the method includes (A) providing an isocyanate component containing the reaction product of (i) an isocyanate monomer and (ii) a first DAPP; (B) providing a polyol component containing (i) a second DAPP and (ii) optionally, a polyol selected from a polyether polyol, a polyester polyol, and combinations thereof; and (C) reacting the isocyanate component with the polyol component to form the two-component solvent-less adhesive composition containing from 15 wt % to 45 wt % units derived from dimer acid, based on the total weight of the two-component solvent-less adhesive composition.

The isocyanate component, the isocyanate monomer, the first DAPP, the polyol component, the second DAPP, the polyol, and the two-component solvent-less adhesive composition may be any respective isocyanate component, isocyanate monomer, first DAPP, polyol component, second DAPP, polyol, and two-component solvent-less adhesive composition disclosed herein.

In an embodiment, the process includes forming the first DAPP and/or the second DAPP by (a) providing a reaction mixture containing dimer acid and a polyol; and (b) polycondensing the reaction mixture to form a DAPP.

The method may comprise two or more embodiments disclosed herein.

The present disclosure also provides an article containing the laminate. Nonlimiting examples of suitable articles include packages, bags, and pouches.

In an embodiment, the laminate contacts a comestible. A "comestible" is an edible food item.

By way of example, and not limitation, some embodiments of the present disclosure will now be described in detail in the following Examples.

Examples

The materials used in the examples are provided in Table 1 below.

TABLE 1

| Material | Properties | Source |
| --- | --- | --- |
| ATUREX ™ 1001 | dimer acid (CAS 61788-89-4) having the Structure (A) greater than 98 wt % dimer; acid value = 194-200 mg KOH/g | Aturex Group |
| DESMODUR ™ 2460 | diphenylmethane diisocyanate (MDI); NCO content = 33.6 wt % liquid at temperatures equal to, or greater than, 20° C. | Covestro |

TABLE 1-continued

| Material | Properties | Source |
| --- | --- | --- |
| Dimer Acid Polyester Polyol A | dimer acid polyester polyol; Mn = 1,200 g/mol; 75 wt % units derived from dimer acid; OH Number = 92 mg KOH/g | Produced as described below |
| PRIPLAST ™ 3162 | dimer acid polyester polyol; Mn = 1,000 g/mol; 36 wt % units derived from dimer acid; OH Number = 100-120 mg KOH/g | Croda International PLC |
| 3-methyl 1,5-pentane diol (MPD) | diol $\text{HO}\diagup\hspace{-1em}\diagdown_{\text{CH}_3}\hspace{-1em}\diagup\hspace{-1em}\diagdown\text{OH}$ | Kuraray |
| VORANOL ™ 1010 L | polypropylene glycol (CAS 25322-69-4) (polyether polyol) Mw = 1000 g/mol; OH Number = 106-114 mg KOH/g; acid number = 0.050 mg KOH/g | The Dow Chemical Company |
| VORANOL ™ CP450 | glycerine propoxylated polyether triol (CAS 025791-96-2) Mw = 450 g/mol; OH Number = 370-396 mg KOH/g; acid number = 0.050 mg KOH/g | The Dow Chemical Company |
| MOR-FREE ™ 706A | Isocyanate prepolymer | The Dow Chemical Company |
| MOR-FREE ™ 698A | Isocyanate prepolymer containing MDI monomer | The Dow Chemical Company |
| Coreactant C79 | Polyol | The Dow Chemical Company |
| Coreactant C83 | Polyol | The Dow Chemical Company |
| TYZOR ™ TBT | tetra-n-butyl titanate (catalyst) | Sigma |

A. Preparation of the Dimer Acid Polyester Polyol A

Dimer Acid Polyester Polyol A (DAPP-A) is prepared by charging 1,600 grams (g) ATUREX™ 1001 (dimer acid) and 540 g 3-methyl 1,5-pentane diol (MPD) into a 3,000 mL Kettle equipped with an agitator and a glass condenser, and heating the Kettle to 100° C. until the reaction mixture turns to a liquid. Once the reaction mixture is in a liquid form, the agitator is turned on and the reaction mixture is mixed while monitoring the temperature inside the Kettle and the temperature of the glass condenser, and ensuring that the top temperature of the glass condenser remains less than 103° C. Once most of the water has been removed, the reaction mixture temperature increases to 220° C., and the top temperature of the glass condenser decreases to less than 100° C., a vacuum is slowly started such that the vacuum reaches a pressure of 25-30 mm Hg within 30 minutes of the vacuum being started. A vacuum pressure of 25-30 mm Hg is maintained and the acid value of the reaction mixture is measured every 25-30 minutes. TYZOR™ TBT (catalyst) is incrementally added to the reaction mixture until the acid value of the reaction mixture is equal to less than 10 mg KOH/g. Then, while maintaining a vacuum pressure of 30 mm Hg, additional TYZOR™ TBT (catalyst) is incrementally added over the period of at least 1 hour, until the acid value of the reaction mixture is equal to, or less than, 0.8 mg KOH/g. Then, the reaction product (DAPP-A) is cooled to 60-70° C.

B. Preparation of Isocyanate Components

The Isocyanate Component of Examples 1-3 and Comparative Sample 4 each is prepared in a 1,000 mL glass reactor. DESMODUR™ 2460 (MDI) is charged into the reactor and maintained at a temperature of 60° C. under nitrogen. Then, DAPP-A (prepared as described above), PRIPLAST™ 3162 (dimer acid polyester polyol), and/or VORANOL™ 1010 L (polypropylene glycol) are charged into the reactor in the amounts provided below in Table 2. The contents of the reactor are mixed, and the temperature of the reaction mixture is increased to 80° C. over a period of 30 minutes. The reaction mixture is then maintained at a temperature of 80° C. for 2-3 hours, until the NCO content reaches a target NCO %. The reaction product is an isocyanate prepolymer. The isocyanate prepolymer is charged into a well-sealed container under nitrogen until it is combined with a polyol component, as described below.

The Isocyanate Component of Comparative Samples 5 and 6 each is a commercial product (MOR-FREE™ 706 A and MOR-FREE™ 698 A, respectively), available from The Dow Chemical Company.

C. Preparation of Polyol Components

The Polyol Component of Examples 1-3 and Comparative Sample 4 each is prepared by mixing 40 grams (g) of a dimer acid polyester polyol (DAPP-A (prepared as described above) or PRIPLAST™ 3162) with 60 g VORANOL™ CP450 (glycerine propoxylated polyether triol) in a reactor under nitrogen (to prevent moisture contamination) at a temperature of 60° C. for 30 minutes. The composition of each Polyol Component is provided in Table 2 below. Before mixing, the moisture content of each dimer acid polyester polyol and the VORANOL™ CP450 is reduced to less than 500 ppm by drying at a temperature of 105° C. under a vacuum.

The Polyol Component of Examples 1-3 and Comparative Sample 4 each is a blend of the dimer acid polyester polyol and the triol (VORANOL™ CP450).

The Polyol Component of Comparative Samples 5 and 6 each is a commercial product (Coreactant C79 and Coreactant C83, respectively), available from The Dow Chemical Company.

D. Formation of Two-Component Solvent-Less Adhesive Compositions

Two-component solvent-less adhesive compositions are prepared by mixing (A) one of the Isocyanate Components prepared as described above, with (B) one of the Polyol Components prepared as described above, in glassware at a temperature of 45° C. A two-component solvent-less adhesive composition is formed.

The components of each example and comparative example adhesive composition are provided in Table 2.

E. Formation of a Laminate

A polyethylene (PE) film that is a monolayer film having a thickness of 60 μm is provided.

A metal foil film is provided. The metal foil film is a monolayer film having a thickness of 20 μm. The metal foil film is pre-laminated with a PET film using ADCOTE™ 545 S: Coreactant F (at a weight ratio of 100:11) (a solvent-based, 2-component polyurethane adhesive, commercially available from The Dow Chemical Company) to form a Metal Foil Pre-Laminate having the following Structure (I):

Metal Foil Film/ADCOTE™ 545 S: Coreactant F Adhesive Layer/PET Film Structure (I).

The example and comparative example adhesive compositions are loaded into a Nordmeccanica SDC Labo Combi 400 laminator. The laminator nip temperature is maintained at 40° C. and the laminator is operated at a speed of 100 meters per minute (m/min). The adhesive composition is applied between the PE film and the Metal Foil Pre-Laminate at a coat weight of 1.8-2.0 grams per square meter (g/m²) to form the following Structure (II):

PE Film/Adhesive Composition/Metal Foil Pre-Laminate Structure (II).

In Structure (II), the adhesive composition directly contacts the surface of the metal foil film layer of the Metal Foil Pre-Laminate (having the Structure (I)).

Then, the Structure (II) is cured at a temperature of 40° C. for a period of two days to form a laminate having the Structure (III):

PE Film/Adhesive Layer/Metal Foil Pre-Laminate Structure (III).

The properties of each laminate example and comparative sample are provided in Table 2.

The NCO Index is calculated in accordance with the Equation (1) provided above. For example, the NCO Index of Example 1 is calculated in accordance with the following Equation (1A):

$$Ex.\ 1\ NCO\ Index = \frac{(144.\ wt\ \%/42) \times (100/45)}{(265/56106)} = 1.6\ \ \ \text{Equation (1A)}$$

F. Results

Comparative Sample 5 and Comparative Sample 6 each includes an adhesive layer formed from (A) an isocyanate component (MOR-FREE™ 706 A and MOR-FREE™ 698 A, respectively) and (B) a polyol component (Coreactant C79 and Coreactant C83, respectively), neither of which includes a dimer acid polyester polyol. In other words, the two-component solvent-less adhesive composition of Comparative Sample 5 and Comparative Sample 6 each contains 0 wt % units derived from dimer acid, based on the total weight of the respective two-component solvent-less adhesive composition. The laminate structure of Comparative Sample 5 and Comparative Sample 6 each exhibits delamination after the boil-in-bag test. Moreover, the laminate structure of Comparative Sample 5 and Comparative Sample 6 each exhibits (i) a bond strength after the boil-in-bag test of less than 1.0 N/15 mm (0.39 N/15 mm and 0.48 N/15 mm, respectively); and (ii) a heat seal strength after the boil-in-bag test of less than 20 N/15 mm (17.89 N/15 mm and 17.76 N/15 mm, respectively). Thus, Comparative Sample 5 and Comparative Sample 6 each exhibits insufficient bond strength and heat seal strength after the boil-in-bag test.

TABLE 2

|  | Example 1 | Example 2 | Example 3 | Comparative Sample 4 | Comparative Sample 5 | Comparative Sample 6 |
|---|---|---|---|---|---|---|
| Isocyanate Component |  |  |  |  |  |  |
|  DAPP-A (dimer acid polyester polyol) (wt %[1]) | 47.4 | 23.5 | — | — | — | — |
|  PRIPLAST ™ 3162 (dimer acid polyester polyol) (wt %[1]) | — | — | 47.4 | — | — | — |
|  DESMODUR ™ 2460 (MDI) (wt %[1]) | 52.6 | 53.5 | 52.6 | 54.3 | — | — |
|  VORANOL ™ 1010 L (polypropylene glycol) (wt %[1]) | — | 23.0 | — | 45.7 | — | — |
|  MOR-FREE ™ 706A (isocyanate) (wt %[1]) | — | — | — | — | 100 | — |
|  MOR-FREE ™ 698A (isocyanate) (wt %[1]) | — | — | — | — | — | 100 |
| Polyol Component |  |  |  |  |  |  |
|  Dimer Acid Polyester Polyol A (wt %[2]) | 40 | 40 | — | 40 | — | — |
|  PRIPLAST ™ 3162 (dimer acid polyester polyol) (wt %[2]) | — | — | 40 | — | — | — |
|  VORANOL ™ CP450 (glycerine propoxylated polyether triol) (wt %[2]) | 60 | 60 | 60 | 60 | — | — |
|  Coreactant C79 (polyol) (wt %[2]) | — | — | — | — | 100 | — |
|  Coreactant C83 (polyol) (wt %[2]) | — | — | — | — | — | 100 |
| Adhesive Composition |  |  |  |  |  |  |
|  Isocyanate Component (wt %[3]) | 69.0 | 69.0 | 71.4 | 69.0 | 62.5 | 71.4 |
|  Polyol Component (wt %[3]) | 31.0 | 31.0 | 28.6 | 31.0 | 37.5 | 28.6 |
| Adhesive Composition Properties |  |  |  |  |  |  |
|  NCO Content of Isocyanate Component (wt %[1]) | 14.4 | 14.4 | 13.8 | 14.4 | 15.0 | 13.0 |
|  Hydroxyl Value of Polyol Component (mg KOH/g) | 265 | 265 | 272 | 265 | 242 | 306 |
|  Isocyanate:Polyol Weight Ratio | 100:45 | 100:45 | 100:40 | 100:45 | 100:60 | 100:40 |
|  NCO Index | 1.6 | 1.6 | 1.7 | 1.6 | 1.4 | 1.4 |
|  Total wt % units Derived from Dimer Acid (wt %[3]) | 33.8 | 21.5 | 16.3 | 9.3 | 0 | 0 |
| Laminate Properties |  |  |  |  |  |  |
|  Initial Bond Strength (N/15 mm) | 10.74 | 7.25 | 12.09 | 2.46 | 3.08 | 3.58 |
|  Bond Strength after Boil-in-Bag (N/15 mm) | 8.68 | 6.28 | 10.38 | 0.59 | 0.39 | 0.48 |

TABLE 2-continued

|  | Example 1 | Example 2 | Example 3 | Comparative Sample 4 | Comparative Sample 5 | Comparative Sample 6 |
|---|---|---|---|---|---|---|
| Initial Heat Seal Strength (N/15 mm) | 54.91 | 52.01 | 52.88 | 21.47 | 50.66 | 44.92 |
| Heat Seal Strength after Boil-in-Bag (N/15 mm) | 46.08 | 30.56 | 48.01 | 14.4 | 17.89 | 17.76 |
| Appearance after Boil-in-Bag | Good | Good | Good | Delamination | Delamination | Delamination |

[1]wt % based on the total weight of the isocyanate component
[2]wt % based on the total weight of the polyol component
[3]wt % based on the total weight of the adhesive composition (including the isocyanate component and the polyol component)

Comparative Sample 4 includes an adhesive layer formed from (A) an isocyanate component containing the reaction product of (i) an isocyanate monomer (MDI) and (ii) a polypropylene glycol—and lacking a DAPP—and (B) a polyol component containing (i) a DAPP (DAPP-A) and (ii) a polyether polyol (VORANOL™ CP450). The two-component solvent-less adhesive composition of Comparative Sample 4 includes less than 15 wt % units derived from dimer acid (9.3 wt %), based on the total weight of the two-component solvent-less adhesive composition of Comparative Sample 4. The laminate structure of Comparative Sample 4 exhibits delamination after the boil-in-bag test. Moreover, the laminate structure of Comparative Sample 4 exhibits (i) a bond strength after the boil-in-bag test of less than 1.0 N/15 mm (0.59 N/15 mm); and
(ii) a heat seal strength after the boil-in-bag test of less than 20 N/15 mm (14.4 N/15 mm). Thus, Comparative Sample 4 exhibits insufficient bond strength and heat seal strength after the boil-in-bag test.

Example 1, Example 2, and Example 3 each includes an adhesive layer formed from (A) an isocyanate component containing the reaction product of (i) an isocyanate monomer (MDI) and (ii) a DAPP (DAPP-A or PRIPLAST™ 3162); and (B) a polyol component containing (i) a DAPP (DAPP-A or PRIPLAST™ 3162) and (ii) a polyether polyol (VORANOL™ CP450). The two-component solvent-less adhesive composition of Example 1, Example 2, and Example 3 each includes 15-45 wt % units derived from dimer acid, based on the total weight of the respective two-component solvent-less adhesive composition (33.8 wt %, 21.5 wt %, and 16.3 wt %, respectively). The laminate structure of Example 1, Example 2, and Example 3 each exhibits a good appearance (i.e., no delamination) after the boil-in-bag test. Moreover, the laminate structure of Example 1, Example 2, and Example 3 each exhibits (i) a bond strength after the boil-in-bag test of at least 1.0 N/15 mm (8.68 N/15 mm, 6.28 N/15 mm, and 10.38 N/15 mm, respectively); and (ii) a heat seal strength after the boil-in-bag test of at least 20 N/15 mm (46.08 N/15 mm, 60.56 N/15 mm, and 48.01 N/15 mm, respectively). Thus, Example 1, Example 2, and Example 3 each exhibits sufficient bond strength and heat seal strength after the boil-in-bag test.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A two-component solvent-less adhesive composition comprising the reaction product of:
(A) an isocyanate component comprising the reaction product of
(i) an isocyanate monomer;
(ii) a first dimer acid polyester polyol;
(B) a polyol component comprising
(i) a second dimer acid polyester polyol; and
(ii) optionally, a polyol selected from the group consisting of a polyether polyol, a polyester polyol, and combinations thereof;
the two-component solvent-less adhesive composition comprising from 15 wt % to 45 wt % units derived from dimer acid, based on the total weight of the two-component solvent-less adhesive composition.

2. The two-component solvent-less adhesive composition of claim 1, wherein the isocyanate component further comprises a second polyol selected from the group consisting of a polyether polyol, a polyester polyol, and combinations thereof.

3. The two-component solvent-less adhesive composition of claim 1, wherein the isocyanate component comprises the reaction product of
(i) from 45 wt % to 90 wt % of the isocyanate monomer;
(ii) from 10 wt % to 55 wt % of the first dimer acid polyester polyol; and
(iii) from 0 wt % to 30 wt % of a second polyol selected from the group consisting of a polyether polyol, a polyester polyol, and combinations thereof.

4. The two-component solvent-less adhesive composition of claim 1, wherein the polyol component comprises
(i) from 10 wt % to 50 wt % of the second dimer acid polyester polyol; and
(ii) from 50 wt % to 90 wt % of the polyether polyol.

5. The two-component solvent-less adhesive composition of claim 1, wherein the two-component solvent-less adhesive composition has an NCO Index from 1.0 to 1.8.

6. The two-component solvent-less adhesive composition of claim 1, wherein the two-component solvent-less adhesive composition has an NCO Index from 1.4 to 1.8.

7. A laminate comprising
a first substrate;
a second substrate; and
an adhesive layer between the first substrate and the second substrate, the adhesive layer formed from the two-component solvent-less adhesive composition of claim 1.

8. The laminate of claim 7, wherein the first substrate is a polyethylene film and the second substrate is a metal foil film; and the laminate has a bond strength after the boil-in-bag test from 1.0 N/15 mm to 15 N/15 mm.

9. The laminate of claim 8, wherein the laminate has a heat seal strength after the boil-in-bag test from 20 N/15 mm to 75 N/15 mm.

10. A method of forming a two-component solvent-less adhesive composition comprising:
(A) providing an isocyanate component comprising the reaction product of
(i) an isocyanate monomer;
(ii) a first dimer acid polyester polyol;

(B) providing a polyol component comprising
  (i) a second dimer acid polyester polyol;
  (ii) optionally, a polyol selected from the group consisting of a polyether polyol, a polyester polyol, and combinations thereof; and
(C) reacting the isocyanate component with the polyol component to form the two-component solvent-less adhesive composition comprising from 15 wt % to 45 wt % units derived from dimer acid, based on the total weight of the two-component solvent-less adhesive composition.

11. The two-component solvent-less adhesive composition of claim 1, wherein the polyol is present in the polyol component; and
  the polyol component has a hydroxyl value from 250 mg KOH/g to 300 mg KOH/g.

12. The two-component solvent-less adhesive composition of claim 11, wherein the polyol is a polyether polyol.

13. The method of claim 10 wherein the polyol is present in the polyol component; and
  the polyol component has a hydroxyl value from 250 mg KOH/g to 300 mg KOH/g.

14. The method of claim 13, wherein the polyol is a polyether polyol.

15. A two-component solvent-less adhesive composition comprising the reaction product of:
(A) an isocyanate component comprising the reaction product of
  (i) an isocyanate monomer;
  (ii) a first dimer acid polyester polyol;
(B) a polyol component with a hydroxyl value from 250 mg KOH/g to 300 mg KOH/g, the polyol component comprising
  (i) a second dimer acid polyester polyol; and
  (ii) a polyol selected from the group consisting of a polyether polyol, a polyester polyol, and combinations thereof;
  the two-component solvent-less adhesive composition comprising from 15 wt % to 45 wt % units derived from dimer acid, based on the total weight of the two-component solvent-less adhesive composition.

16. The two-component solvent-less adhesive composition of claim 15, wherein the polyol is a polyether polyol.

* * * * *